United States Patent
Konstantopoulos et al.

(10) Patent No.: US 11,785,098 B2
(45) Date of Patent: Oct. 10, 2023

(54) SYSTEMS AND METHODS FOR PERSONALIZATION OF A COMPUTER APPLICATION

(71) Applicants: Atlassian Pty Ltd., Sydney (AU); Atlassian Inc., San Francisco, CA (US)

(72) Inventors: Iraklis Konstantopoulos, Sydney (AU); Tristan Antony Frizza, Sydney (AU); Lily Serna, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/037,351

(22) Filed: Sep. 29, 2020

(65) Prior Publication Data

US 2021/0099541 A1  Apr. 1, 2021

(30) Foreign Application Priority Data

Sep. 30, 2019  (AU) .............................. 2019903677

(51) Int. Cl.
*G06F 15/173* (2006.01)
*H04L 67/306* (2022.01)
*H04L 67/50* (2022.01)

(52) U.S. Cl.
CPC .......... *H04L 67/306* (2013.01); *H04L 67/535* (2022.05)

(58) Field of Classification Search
CPC ...... H04L 67/306; H04L 67/22; H04L 67/535
USPC ................................................ 709/223, 224
See application file for complete search history.

(56) References Cited

U.S. PATENT DOCUMENTS

| | | | | |
|---|---|---|---|---|
| 10,942,834 | B2* | 3/2021 | Cohen ................. | G06F 11/3438 |
| 2008/0250323 | A1* | 10/2008 | Huff ........................ | G06F 9/453 |
| | | | | 715/733 |
| 2012/0066065 | A1 | 3/2012 | Switzer | |
| 2012/0137367 | A1 | 5/2012 | Dupont et al. | |
| 2013/0055097 | A1 | 2/2013 | Soroca et al. | |
| 2013/0262352 | A1* | 10/2013 | Sung ..................... | G06N 20/00 |
| | | | | 706/12 |
| 2014/0189102 | A1* | 7/2014 | Fruchtman ............ | G06F 21/105 |
| | | | | 709/224 |

(Continued)

FOREIGN PATENT DOCUMENTS

WO  WO2017/044349  3/2017

OTHER PUBLICATIONS

Australian Patent Office International-Type Search Report, Australian Patent Application No. 2019903677, 9 pages, dated Jun. 2, 2020.

*Primary Examiner* — Kaylee J Huang
(74) *Attorney, Agent, or Firm* — Brownstein Hyatt Farber Schreck, LLP

(57) ABSTRACT

Systems and methods for personalizing a computer application for a user are disclosed. The method including providing multiple user groups, where each user group is assigned a set of computer application features and no two sets of computer application features are identical. The method further includes monitoring computer application usage of the user over a first period of time; based on the monitored usage, allocating a first user group to the user from the multiple user groups, the first user group fitting the user; and personalizing the computer application for the user by providing the set of computer application features assigned to the first user group.

20 Claims, 8 Drawing Sheets

(56) References Cited

U.S. PATENT DOCUMENTS

| | | | |
|---|---|---|---|
| 2015/0373107 A1* | 12/2015 | Chan | H04L 67/1095 |
| | | | 709/205 |
| 2016/0026510 A1* | 1/2016 | Furtwangler | G06F 11/3452 |
| | | | 719/318 |
| 2017/0068406 A1* | 3/2017 | Mark | G06F 3/04886 |
| 2017/0249169 A1* | 8/2017 | Li | G06F 9/453 |
| 2018/0288063 A1* | 10/2018 | Koottayi | H04L 63/102 |
| 2019/0004823 A1* | 1/2019 | Walker | G06F 40/106 |
| 2019/0018550 A1* | 1/2019 | Busi | G06Q 30/0631 |
| 2020/0082105 A1* | 3/2020 | Shachar | G06F 21/629 |
| 2020/0162515 A1* | 5/2020 | Dubinsky | G06N 20/00 |
| 2020/0274939 A1* | 8/2020 | Sakib | G06F 11/3419 |
| 2020/0387274 A1* | 12/2020 | Rodriguez Bravo | |
| | | | G06F 3/0481 |

\* cited by examiner

Top Events sorts by Cluster 6

| Event | All Clusters 47936 users Avg# events | Cluster 6 3182 users Avg# events | Cluster 1 16956 users Avg# events | Cluster 2 8718 users Avg# events | Cluster 3 8042 users Avg# events | Cluster 4 7131 users Avg# events | Cluster 5 3907 users Avg# events |
|---|---|---|---|---|---|---|---|
| Viewed globalSearchDrawer | 0.76 | 7.52 +1.2 σ | 0.14 -0.1 σ | 0.17 -0.1 σ | 0.14 -0.1 σ | 1.0 +0.0 σ | 0.076 -0.1 σ |
| Viewed notificationsScreen | 3.21 | 17.98 +1.1 σ | 1.66 -0.1 σ | 1.83 -0.1 σ | 1.78 -0.1 σ | 4.65 +0.1 σ | 1.27 -0.1 σ |
| Viewed viewAccountScreen | 0.28 | 1.17 +0.4 σ | 0.18 -0.0 σ | 0.21 -0.0 σ | 0.26 -0.0 σ | 0.32 +0.0 σ | 0.15 -0.1 σ |
| Viewed viewIssueScreen | 101.83 | 166.86 +0.3 σ | 45.87 -0.3 σ | 80.7 -0.1 σ | 48.71 -0.3 σ | 206.4 +0.5 σ | 257.37 +0.8 σ |
| Viewed ProjectsScreen | 4.83 | 7.68 +0.3 σ | 3.91 -0.1 σ | 4.43 -0.0 σ | 6.95 +0.2 σ | 4.51 -0.0 σ | 3.63 -0.1 σ |

Fig. 8

SYSTEMS AND METHODS FOR PERSONALIZATION OF A COMPUTER APPLICATION

CROSS-REFERENCE TO RELATED APPLICATION(S)

This application claims the benefit of Australian patent application no. AU2019903677, filed Sep. 30, 2019 and titled "An Improved System and Method for Personalization of a Computer Application," the disclosure of which is hereby incorporated herein by reference in its entirety.

TECHNICAL FIELD

The present disclosure is directed to computer applications and more particularly, to personalization of computer applications.

BACKGROUND

Most computer applications available today have standard user interfaces (UIs) and typically provide standard features to all users. Some variations in features and/or (UIs) may be provided—e.g., some application developers may offer different versions (expert version, beginner version, etc.) of a computer application to users. However, the UI and features within a particular version are typically standard for all users of that version.

As a result, there is a need for improved personalization of computer applications for users.

SUMMARY

According to some embodiments of the present disclosure, there is provided a computer-implemented method for personalization of a computer application for a user. The method includes providing multiple user groups. Each user group may be assigned a set of computer application features such that no two sets of computer application features are identical. The method further includes monitoring computer application usage of the user over a first period of time and allocating a first user group to the user from the multiple user groups. The first user group fits the user based on the monitored computer application usage of the user over the first period of time. The method also includes personalizing the computer application for the user by providing the set of computer application features assigned to the first user group.

According to other embodiments of the present disclosure, there is provided a computer processing system. The system includes a processing unit and non-transitory computer-readable medium storing sequences of instructions. When the non-transitory computer readable medium is executed by the processing unit, the processing unit provides multiple user groups. Each user group being assigned a set of computer application features such that no two sets of computer application features are identical. The non-transitory computer-readable medium further stores sequences of instructions, which when executed by the processing unit, cause the processing unit to monitor computer application usage of the user over a first period of time and allocate a first user group to the user from the multiple user groups. The first user group fits the user based on the monitored computer application usage of the user over the first period of time. The non-transitory computer-readable medium further stores sequences of instructions, which when executed by the processing unit, cause the processing unit to personalize the computer application for the user by providing the set of computer application features assigned to the first user group.

BRIEF DESCRIPTION OF THE DRAWINGS

In the drawings:

FIG. 8 is a table illustrating clustering according to one example.

Figure 1:
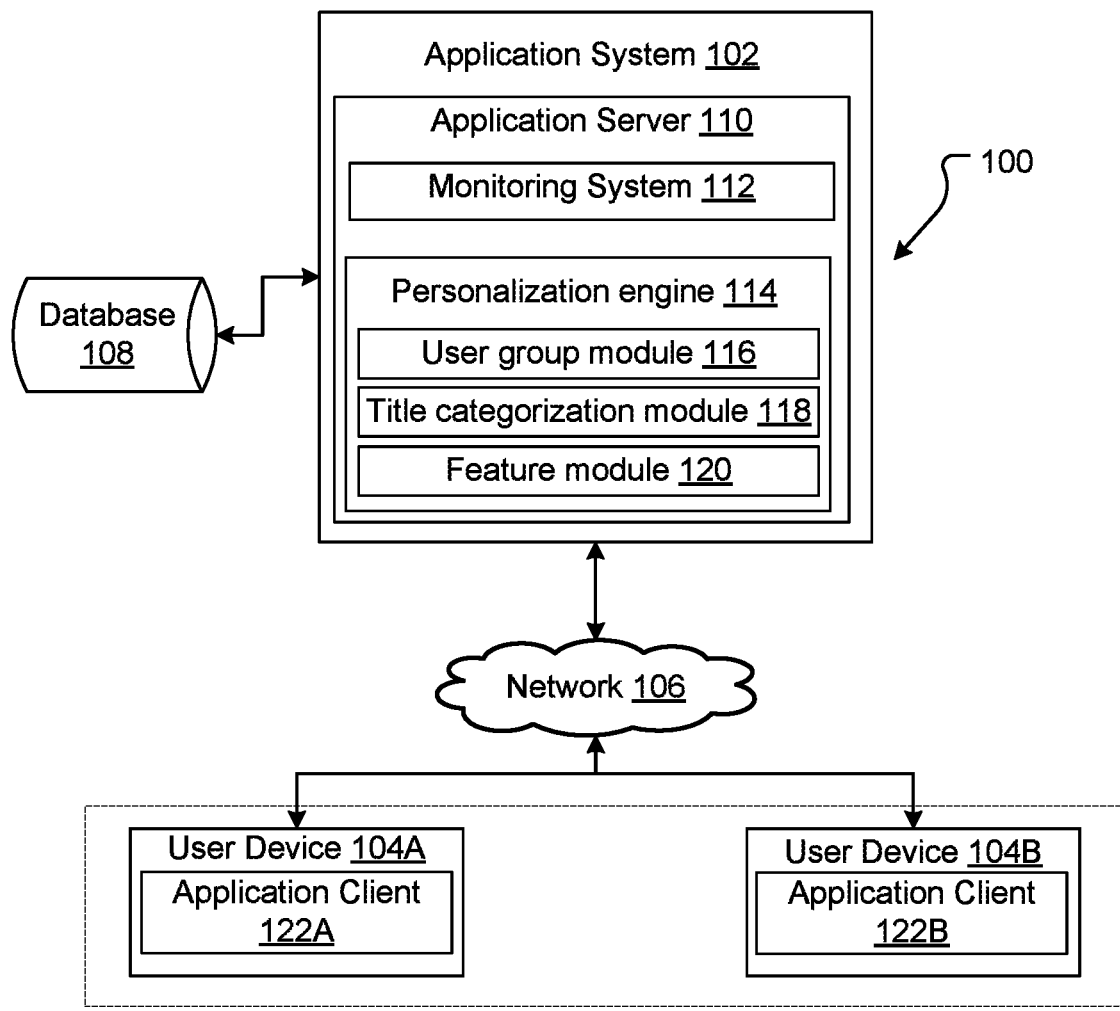
FIG. 1 is a block diagram illustrating an example environment in which features of the present disclosure can be implemented.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Although architects and designers may add a multitude of functions in computer applications (keeping users of the computer application in mind)—not all users may use all the features offered by the computer application. In fact, most users may frequently use only a handful of features of the application and may have to navigate through multiple menus, submenus, or pages to use these features. This can be frustrating for users. Similarly, in applications that have home pages, some people might like to see certain information on their home page whereas other users might like to see other information on this page. Standard interfaces may therefore be cumbersome/annoying for users.

To address this, some applications allow users to personalize their computer applications, e.g., by making some changes to the look and feel of a computer application. For instance, Microsoft Office® allows users to customize their ribbons and create shortcuts for frequently used features and Microsoft Outlook® allows users to change the position of the reading pane, tasks, calendars, etc. However, these changes are limited and oftentimes users have to be technologically savvy to know how to make these changes or create shortcuts for themselves.

Embodiments of the present disclosure address one or more of these issues. In particular, some embodiments of the present disclosure automatically personalize computer applications for users. To do this, a personalization engine is employed. The personalization engine may be configured to collect application usage data from users of a computer application. After a sufficiently large amount of application usage data is collected, the personalization engine forms user clusters (or designated user groups) based on the usage data. Each designated user group has usage patterns that are similar in one or more measurable dimensions. The personalization engine may then determine one or more features of the computer application that should be offered to the designated user groups and/or may determine the look and feel of the computer application best suited for different designated user groups (based on their usage data). In this manner, instead of personalizing the computer application for each user of the application, the personalization engine can personalize computer applications for users based on the designated user group they are allocated to.

In addition to creating user groups, the personalization engine may also be configured to assign/match a new user to a particular designated user group based on the new user's individual usage data. That is, user usage data is analyzed to determine which designated user group matches the user usage data. The user usage data typically has similar usage patterns to at least one cluster.

In certain embodiments, the personalization engine is also configured to re-cluster the designated user groups. That is, designated user groups can be recalculated based on different dimensions or different metrics for measuring similarity in usage data. Designated user groups can also be recalculated based on the same dimensions and metrics, but with additional or different usage data. Such recalculations can occur on an ad-hoc or periodic basis, and can be used to determine whether the designated user groups are still relevant, whether new user groups need to be created or whether two or more user groups should be combined.

In such embodiments, an individual user may also be re-assigned to a different designated user group that matches the user based on the user's individual usage data. That is, a person's usage data may change over time (e.g., because the user is in a different role) and therefore on recalculation it is possible that the user may be allocated to a different cluster from the one they were allocated to previously.

It will be appreciated that the disclosed personalization engine may be configured to perform two or more of these functions together. For example, a personalization engine may be configured to determine user groups at a first time and then determine the user groups for new users as and when their user accounts are created. Further, the functions of the personalization engine can be performed at different intervals. For example, designated user groups may be re-clustered at a first frequency, whereas individual users may be re-assigned to designated user groups at the same frequency or a different frequency.

Much of this disclosure is described in relation to an issue tracking system (such as Jira® offered by Atlassian, Inc.). Generally speaking, issue tracking systems allow issue tracking and agile project management. While the techniques and features described here can be applied to any type of computer application, an issue tracking system is used as an illustrative example application.

These and other aspects of the present disclosure will be described in detail with reference to FIGS. 1-8 below.

FIG. 1 illustrates an example environment 100 in which embodiments and features of the present disclosure are implemented. Specifically, FIG. 1 illustrates the systems involved in personalizing computer applications for users. Example environment 100 includes an application system 102 and user devices 104A and 104B (collectively referred to as user devices 104). The application system 102 is in communication with the user devices 104 via a communications network 106.

In general, the application system 102 is a system entity that hosts one or more computer applications and/or content. The application system 102 includes an application server 110 for hosting a computer application. The application server 110 may be coupled to one or more storage devices (e.g., database 108) for storing application specific data. Examples of computer applications hosted by the application system 102 may include interactive chat applications (e.g., Slack™), collaborative content applications (e.g., Confluence™), software code management system (e.g., Bitbucket™), and issue tracking applications (e.g., Jira™).

In order to run a particular computer application, the application server 110 includes one or more application programs, libraries, APIs or other software elements that implement the features and functions of the application. In one example, the application server 110 includes a monitoring system 112, which monitors usage of the application hosted by the application server 110 and a personalization engine 114, which is configured to automatically personalize the computer application hosted by the application server 110 as described in detail below.

The application system 102 also stores application data. Application data generally includes: data defining the operation of the hosted application (for example, user accounts, user permissions, and the like); and application data (i.e., the content hosted/maintained by the application, which can be, for example, issue data (in an issue tracking system), page/document data (in a collaborative content application), conversation and chatroom history (in chat applications). The data is stored on and managed by database 108. Database 108 is provided by a database server (not shown) which may be hosted by application server 110, but is more typically hosted on a separate physical computer in communication (directly or indirectly via one or more networks) with the server 110.

The application server 110 may be a web server (for interacting with web browser clients) or an application server (for interacting with dedicated application clients). While single server architecture has been described herein, it will be appreciated that the application system 102 can be implemented using alternative architectures. For example, in certain cases a clustered architecture may be used where multiple server computing instances (or nodes) are instantiated to meet system demand Conversely, in the case of small enterprises with relatively simple requirements an application system 102 may be a stand-alone implementation (i.e. a single computer directly accessed/used by the end user).

User devices 104 may be any device suitable for performing client-side operations described herein, for example a mobile device (e.g. a tablet or mobile phone), a portable device (such as laptop computer), or any other computing device (e.g. a desktop computer).

Generally speaking, users of user devices 104 are associated with one or more user accounts and interact with the application system 102. This interaction may include any type of user account interaction with the application system 102, including interaction with content and/or computer application(s) hosted by the application system 102. Example interactions include accessing/viewing and/or contributing to one or more documents hosted by the application system 102, writing posts, commenting on content, visiting web pages, sharing, liking, or viewing content, communicating with user accounts in real-time chat interfaces, etc.

To allow users to perform these functions, as illustrated in FIG. 1, the user devices 104 include a client ( ) application (e.g., application client 122A and 122B) that is configured to access computer applications made available by application system 102.

The application client 122 includes instructions and data stored in the memory (e.g. non-transitory computer readable media) of the user devices 104 on which the applications are installed/run. These instructions are executed by a processor of the user device 104 to perform various functions as described herein. By way of example, some functions performed by the client 122 includes communicating with computer applications hosted by the application system 102, rendering user interfaces based on instructions received from the applications, receiving inputs from user to interact with content hosted by application system 102.

The application client 122 may be implemented in various ways. For example, the application client 122 may be a web browser application, which accesses the computer applications hosted by the application system 102 via appropriate uniform resource locators (URL) and communicates with the application system 102 via general world-wide-web protocols. In this case, the web browser application is configured to request, render and display user interfaces that conform to a markup language, and may be capable of internally executing browser-executable code, or other forms of code. Alternatively, the application client 122 may be a specific application programmed to communicate with the application system 102 using defined application programming interface (API) calls.

For completeness it is noted that application or user operations may be performed by the application client 122, the application server 110 or by a combination of the application client 122 and the application server 110. For example, application operations involving the display of user interfaces may be performed by the application client 122. The data displayed, however, may be generated by the application client 122 itself, or generated by the application server 110 communicated to the client 122. Similarly, application operations involving user input involve the user device 104 receiving user input and passing that input to the application client 122. The information input may be processed by the application client 122 itself, or communicated by the application client 122 to the application system 102 to be processed by the application server 110. Application operations involving writing data to the data store 108 involve the application server 110. The data written to the data store 108 may, however, be communicated to the application server 110 by the application client 122.

As described previously, the application system 102 includes a monitoring system 112. The monitoring system 112 includes logic and code required for monitoring application usage data. For example, the monitoring system 112 may be configured to track user interactions with the computer application via the application client 122. In one embodiment, each time a user interacts with the computer application, one or more system "events" may be generated. In some embodiments, the monitoring system 112 may track user interactions by tracking system events generated in response to user interaction with the computer application.

The personalization engine 114 is configured to perform one or more functions such as determining designated user groups, assigning users to the designated user groups, recalculating designated user groups and identifying one or more product features for each designated user group to personalize the computer application for each group. In addition, the personalization engine 114 may also be configured to categorize users of the computer application. In alternative embodiments, however, operations such as these (and others) can instead be performed by the application client 122.

To perform these functions, the personalization engine 114 includes a user group module 116 and a title categorization module 118. The user group module 116 includes the logic and code for determining designated user groups and allocating a user to a designated user group. The title categorization module 118 includes the logic and code for determining a category of a user based on a free form description of the user. The personalization engine 114 also includes a feature module 120. The feature module 120 includes logic and code for maintaining one or more features of the computer application that can be personalized. As a result, the personalization engine 114 may personalize the computer application to present, e.g., one or more features as default to particular designated user groups, present a web page as a home/landing page, promote the one or more features to be easily accessible for another designated user group and/or change the navigation options to make the one or more features more readily accessible, or modify the flow of the application for the one or more features for a designated user group.

In some embodiments, the personalization engine 114 and application clients 122 operate together to provide the personalization functionality. That is, in some embodiments, the operations performed by the personalization engine 114 described above for determining and allocating designated user groups may require the application client (perhaps in conjunction with the application server 110) to provide personalization, such as personalized features of the computer application, to the user.

It will be appreciated that although only two user devices (104A and 104B) have been depicted, in normal operation, many more user devices 104 may be connected to the application system 102 through the network 106. In addition, it will be appreciated that although the personalization engine 114 in FIG. 1 is depicted as part of the application system 102, in some embodiments it may be hosted on a different system.

Further, it will be appreciated that although only one application system 102 is depicted in FIG. 1, the environment 100 can have more application systems 102. For example, a company like Atlassian that typically offers different computer applications may have multiple such computer application systems 102 connected to the user devices 104. When multiple application systems 102 are present, the personalization engine 114 may be a separate/standalone entity that receives application usage data from the monitoring modules 112 of the application systems 102 and performs personalization operations for the application systems 102. In other cases, even the monitoring system 112 may be either a standalone entity or part of the personalization engine 114. In such cases, the monitoring system 112 may receive event data from the one or more application systems 102 and communicate these event records (after some processing) to the personalization engine 114.

Figure 2:
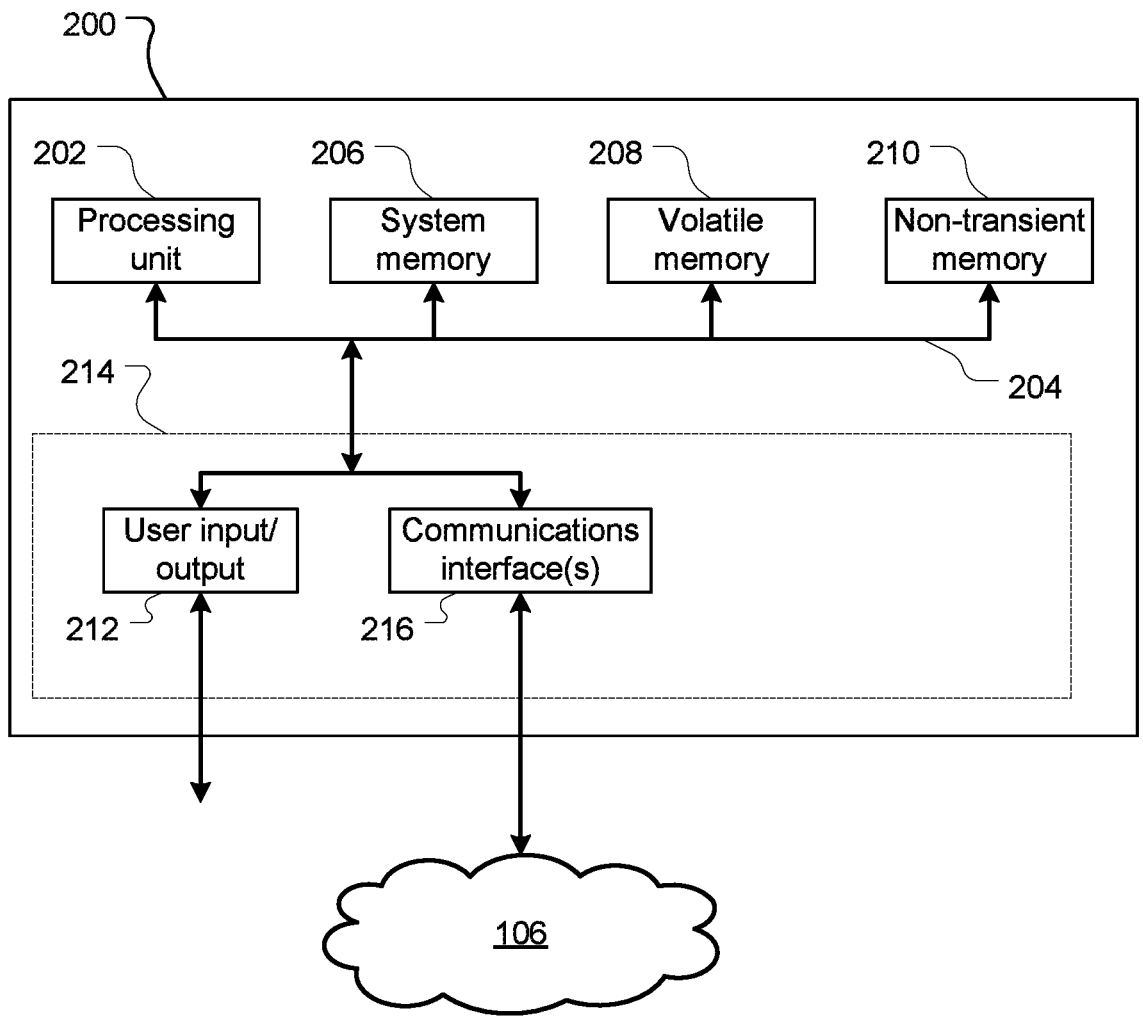
FIG. 2 is a block diagram of an example computer processing system.

Systems as described in the present disclosure are implemented using an electronic device. The electronic device is, or includes, a computer processing system. FIG. 2 provides a block diagram of one example of a computer processing system 200. System 200 as illustrated in FIG. 2 is a general-purpose computer processing system. It will be appreciated that FIG. 2 does not illustrate all functional or physical components of a computer processing system. For example, no power supply or power supply interface has been depicted, however system 200 either carries a power supply or is configured for connection to a power supply (or both). It will also be appreciated that the particular type of computer processing system determines the appropriate hardware and architecture, and alternative computer processing systems suitable for implementing aspects of the invention may have additional, alternative, or fewer components than those depicted, combine two or more components, and/or have a different configuration or arrangement of components.

The computer processing system 200 includes at least one processing unit 202. The processing unit 202 may be a single computer-processing device (e.g. a central processing unit, graphics processing unit, or other computational device), or may include a plurality of computer processing devices. In some instances all processing is performed by processing unit 202, however in other instances processing may also, or alternatively, be performed by remote processing devices accessible and useable (either in a shared or dedicated manner) by the system 200.

Through a communications bus 204 the processing unit 202 is in data communication with one or more machine-readable storage (memory) devices that store instructions and/or data for controlling operation of the processing unit 202. In this instance system 200 includes a system memory 206 (e.g. a BIOS), volatile memory 208 (e.g. random access memory such as one or more DRAM modules), and non-volatile/non-transitory memory 210 (e.g. one or more hard disk or solid state drives).

System 200 also includes one or more interfaces, indicated generally by 214 via which system 200 interfaces with various devices and/or networks. Generally speaking, other devices may be physically integrated with system 200, or may be physically separate. Where a device is physically separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. Wireless connection with other devices/networks may similarly be by any appropriate standard or proprietary hardware and communications protocols. Generally speaking, the devices to which system 200 connects—whether by wired or wireless means—allow data to be input into/received by system 200 for processing by the processing unit 202, and data to be output by the system 200. Example devices are described below, however it will be appreciated that not all computer-processing systems 200 include all mentioned devices, and that additional and alternative devices to those mentioned may well be used.

For example, system 200 may include or connect to one or more input devices by which information/data is input into (received by) system 200. Such input devices may include physical buttons, alphanumeric input devices (e.g. keyboards), pointing devices (e.g. mice, track pads and the like), touchscreens, touchscreen displays, microphones, accelerometers, proximity sensors, geo-positioning devices and the like. System 200 may also include or connect to one or more output devices controlled by system 200 to output information. Such output devices may include devices such as indicators, displays (including touchscreen displays), audio output devices such as speakers, vibration modules, and other output devices. System 200 may also include or connect to devices which may act as both input and output devices, for example memory devices (hard drives, solid state drives, disk drives, compact flash cards, SD cards and the like) which system 200 can read data from and/or write data to, and touch-screen displays which can both display (output) data and receive touch signals (input).

System 200 may also connect to communications networks (e.g. the Internet, a local area network, a wide area network, a personal hotspot etc.) to communicate data to and receive data from networked devices, which may themselves be other computer processing systems.

It will be appreciated that system 200 may be any suitable computer processing system such as, by way of non-limiting example, a desktop computer, a laptop computer, a netbook computer, tablet computer, a smart phone, a Personal Digital Assistant (PDA), a cellular telephone, a web appliance. Although the system 200 may act as a server in a client/server type architecture, the system 200 may also include user input/output directly via the user input/output interface 212 or alternatively receiving equivalent input/output of a user via a communications interface 216 for communication with a network 106.

The number and specific types of devices which system 200 includes or connects to depends on the particular type of system 200. For example, if system 200 is a desktop computer it typically connects to physically separate devices such as (at least) a keyboard, a pointing device (e.g. mouse), and a display device (e.g. a LCD display). Alternatively, if system 200 is a laptop computer it typically includes (in a physically integrated manner) a keyboard, pointing device, a display device, and an audio output device. Further alternatively, if system 200 is a tablet device or smartphone, it may typically include (in a physically integrated manner) a touchscreen display (providing both input means and display output means), an audio output device, and one or more physical buttons. To the extent that system 200 is an example of a user device 104A, 104B, then the user input devices as described above are typically the means by which a user interacts with a system to generate the events relevant to the personalization engine 114. A person skilled in the art would understand there may be other types of input devices which would operate similarly for the purposes of the present disclosure, such as a microphone for voice activated user commands or other devices not described here.

System 200 stores or has access to instructions and data which, when processed by the processing unit 202, configure system 200 to receive, process, and output data. Such instructions and data typically includes an operating system.

System 200 also stores or has access to instructions and data (i.e. software) which, when processed by the processing unit 202, configure system 200 to perform various computer-implemented processes/methods in accordance with embodiments of the invention (as described below). It will be appreciated that in some cases part or all of a given computer-implemented method is performed by system 200 itself, while in other cases processing may be performed by other devices in data communication with system 200.

Instructions and data are stored on a non-transitory computer-readable medium accessible to system 200. For example, instructions and data may be stored on non-transitory memory 210. Instructions may be transmitted to/received by system 200 via a data signal in a transmission channel enabled (for example) by a wired or wireless network connection.

Example Process

Figure 3:
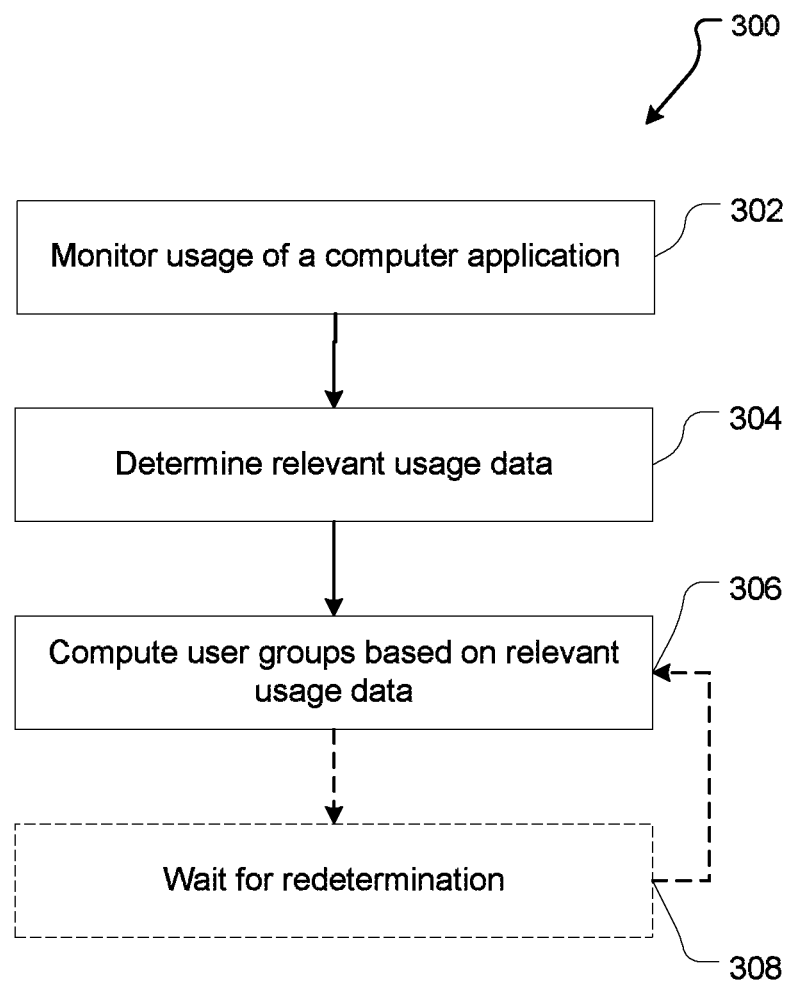
FIG. 3 is a flowchart illustrating an example method for generating designated user groups based on application usage data.
Figure 4:
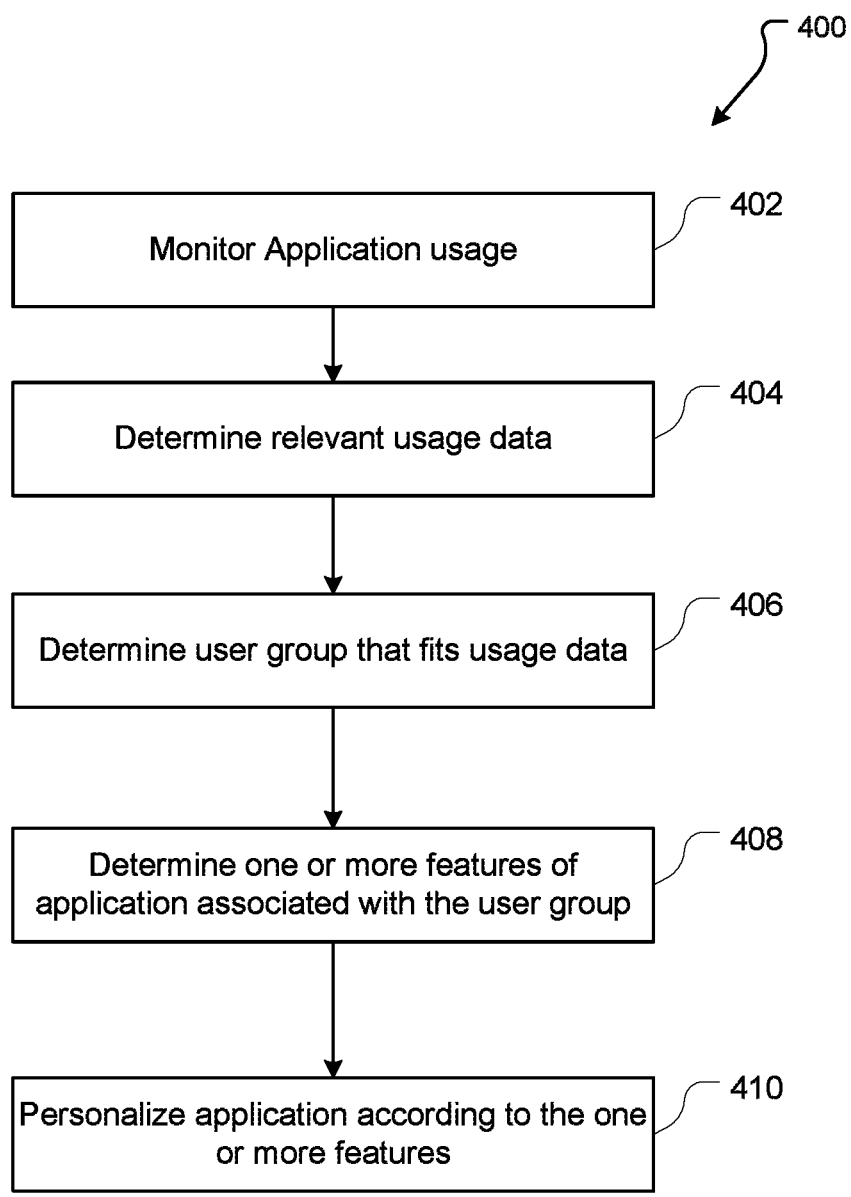
FIG. 4 is a flowchart illustrating an example method for determining a designated user group for a user.

FIGS. 3-4 illustrate example processes for personalization of a computer application. In particular, FIG. 3 illustrates an example process 300 for determining designated user groups or clusters of users. FIG. 4 illustrates an example process 400 for determining a user group for a given user and for personalizing the computer application accordingly. The process of FIG. 3 may be performed once and/or on a periodic basis whereas the process of FIG. 4 may be performed whenever a new user account is created for the software application.

Method 300 commences at step 302, where the monitoring system 112 monitors usage of a computer application hosted by the application system 102. In some embodiments, this is a continuous process.

In this disclosure, events are typically generated whenever users interact with the computer application via the application client 122. In some cases, the application clients 122 send any detected user interaction events to the application server 110 in real time. In other cases, the application clients 122 may store the recorded user interaction events on the user device 104 and periodically transmit the stored events in batches to the application server 110. In any event, the monitoring system 112 receives the events from the application server 110 and stores them in the form of event records in the database 108.

In some example applications, such as collaborative content management applications, events are associated with a time at which the event occurred as well as with a user identifier and/or an account identifier of the user involved in the event so that events can be tracked by users or accounts and time. In some cases, a user may have privacy settings that allow the monitoring system 112 to estimate a geographical position of the user. Other privacy settings may prevent, or at least make more difficult, an estimation of a geographical position of the user.

At step 304, the monitoring system 112 generates application usage data both for individual users and for the usage of the application generally by all users, based on the monitored usage data (e.g., the stored event records). Application usage data is typically composed of snapshots or fragments of the monitored usage data, such as events or sequences of events. Although in this example step 304 is illustrated as a step distinct from step 306, in some embodiments it may be performed as part of step 306.

In some embodiments, the monitoring system 112 may receive any and all user interaction events from the application clients 122 or application server 110 including e.g., user event types that record when users land on a homepage or landing page of the computer application, user event types that record when a user closes the application client 122, user event types when a user interacts with an input control provided on a particular webpage, user events when a user interacts with a feature provided by the software application, etc. However not all event types may be relevant for computing designated user groups. That is, not all usage data is necessarily required to compute the designated user groups.

In some cases, a subset of the event types may be used to save computational cost and complexity, for data pre-processing, or because there are some event types, which are known to be more predictive for the purposes of determining the designated user groups. There may be other reasons for discarding or ignoring events, for example, where an application generates events that are irrelevant.

In certain embodiments, the monitoring system 112 generates application usage data by analyzing and compiling the stored event records. For example, the monitoring system 112 may analyses an event type of an event record to determine whether the event should be included in the application usage data or not. Event types that are determined to be irrelevant, may be discarded. In some embodiments, there may be multiple ways to analyses events. For example, an event type that is considered to be non-relevant may simply be ignored and not be stored in the database 108 at all. In other cases, events of a particular event type may be initially stored in the database 108 (e.g., because such events were considered relevant at first) but then subsequently discarded as irrelevant (e.g., if the criteria for determining relevancy has changed). In still other cases, events of a particular event type may be received and analyzed but determined not to be required for the clustering analysis. In each case, the result may be the same—that is, a recorded event may make no material difference to the computed application usage data. In some cases, a subset of event record types, for example, event record types that have a high differentiating factor between different user groups, may be complied into the usage data.

It certain embodiments, the personalization engine 114 may provide the criteria for determining whether an event type is relevant or not to the monitoring system 112 and these criteria may change over time. In other embodiments, the process step of compiling application usage data may be performed by the personalization engine 114 itself.

Once the relevant events are analyzed and collected, the monitoring system 112 may compile the events into application usage data. The usage data reflects the events of some or all the users at a high level such that groups, patterns or trends can be ascertained by the personalization engine 114, and specifically by the user group module 116.

The following table, which is an example of application usage data, indicates how events may be monitored and compiled for all users.

TABLE 1

Jira specific events measured by the number of times each event is triggered, averaged for all users

| Event name | Average number of events (all users) |
| --- | --- |
| viewed globalSearchDrawer | 0.76 |
| viewed notificationsScreen | 3.21 |
| viewed viewAccountScreen | 0.28 |
| viewed viewIssueScreen | 101.83 |
| viewed projectsScreen | 4.83 |

Note that in table 1, different events are triggered a different number of times for users. As will be discussed below, some users trigger some events more than an average number of times and other events less than an average number of times. Identification of these patterns may help identify the designated user groups.

In a similar manner, the monitoring system 112 analyses events for a particular user and maintains application usage data for individual users in database 108.

At step 306, the user group module 116 performs clustering of the usage data. In one embodiment, the user group module 116 determines, through cluster analysis, groups of usage data that are similar in one or more dimensions, where a dimension is a particular metric or measure by which the usage data can be analyzed, such as average frequency of an event. Each cluster therefore defines a group of users by their usage behavior. The user group module 116 may allocate a designated user group to be associated with a specific cluster.

Any clustering technique can be used to determine the designated user groups. Example techniques may utilize unsupervised learning to find the structure or relationships between different dimensions of usage data. Several approaches to clustering using unsupervised learning techniques can be used, such as subspace clustering, projected clustering, hybrid approaches (that use a combination of both and heuristics to arrive at satisfactory answers), pattern based clustering and correlation clustering. This creates different clusters of usage data and can enable the user group module 116 to put any newly acquired usage data in an appropriate cluster. If some clusters are known beforehand and some of the usage data are classified accordingly, then a form of semi-supervised learning may be used. One specific example technique is non-negative matrix factorization.

Figure 6A:
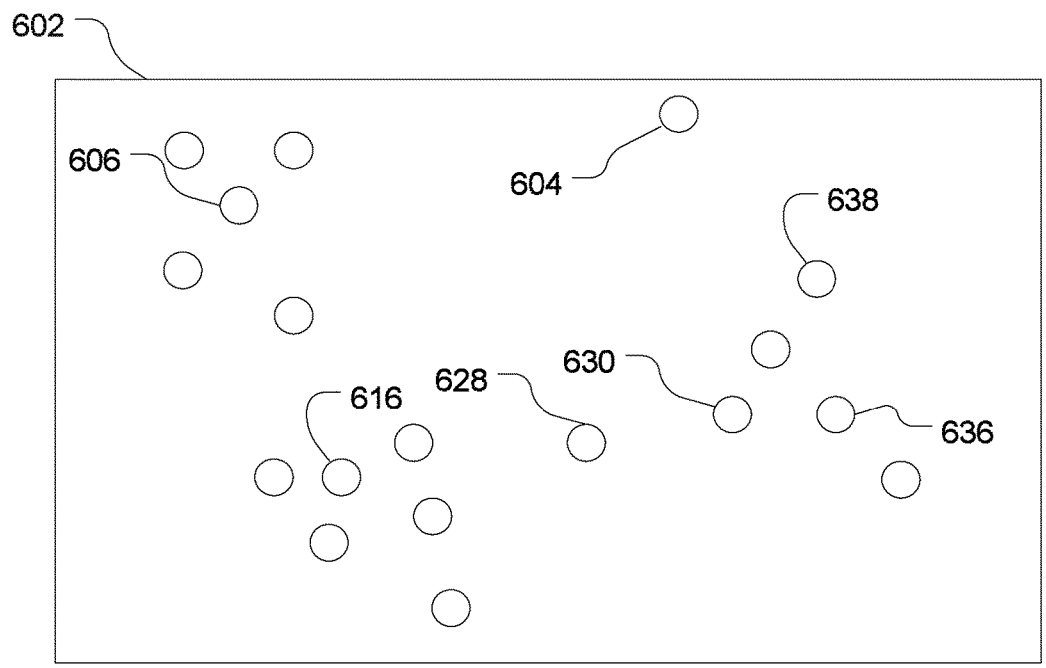
FIGS. 6A and 6B are schematics illustrating examples of clustering
Figure 6B:
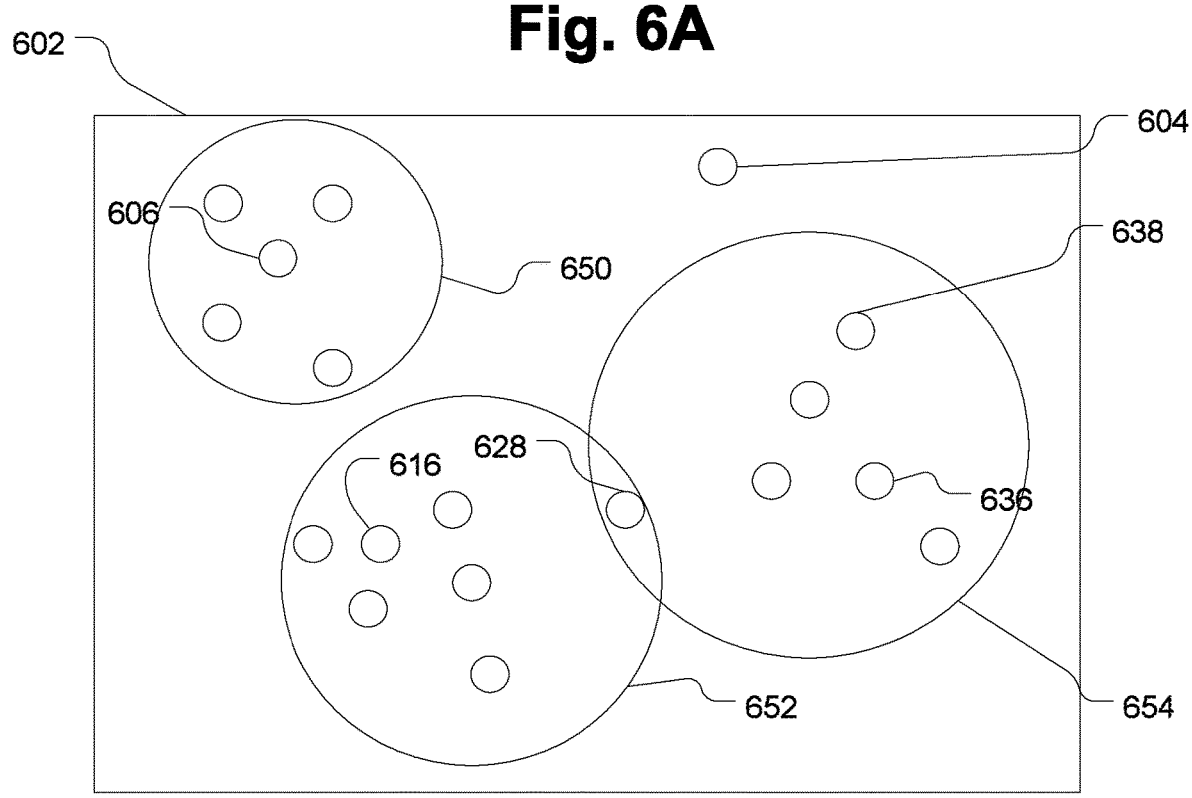

FIG. 6A and FIG. 6B illustrate examples of clustering using unsupervised learning techniques in two-dimensional space 600. While FIGS. 6A and 6B illustrate only two dimensions such as frequency of one event type in the horizontal dimension and frequency of another event type in the vertical dimension, it is noted that clustering may occur in (many) more dimensions. As can be seen in FIG. 6A, the usage data 604-638 are distributed over the two dimensional space but are not evenly distributed. For example, usage data 604, 628 and 638 are relatively isolated from other usage data whereas the usage data 606, 616, and 620 are nearby. A distance measure, such as vector length or norm, can be used to determine how different a pair of two usage data are in the two or more dimensions.

FIG. 6B illustrates the two dimensional space 630 but with clusters 650, 652 and 654 identified. In this case, the clusters cover all but one of the usage data 604. That is, the clusters as represented by circles 650, 652 and 654 enclose all the usage data except for usage data 604. A more programmatic approach may be to determine clusters based on minimizing the average distance but maximizing the coverage of the dimensional space. In this example, not all the usage data fit cleanly into a cluster. For instance, the usage data 628 is in both clusters 652 and 654. The usage data 604 is not determined to be in any cluster. In this case, the user group module 116 may make an approximate estimation on the closest match, which by simple two-dimensional distance in this example, is the cluster 654.

Figure 7:
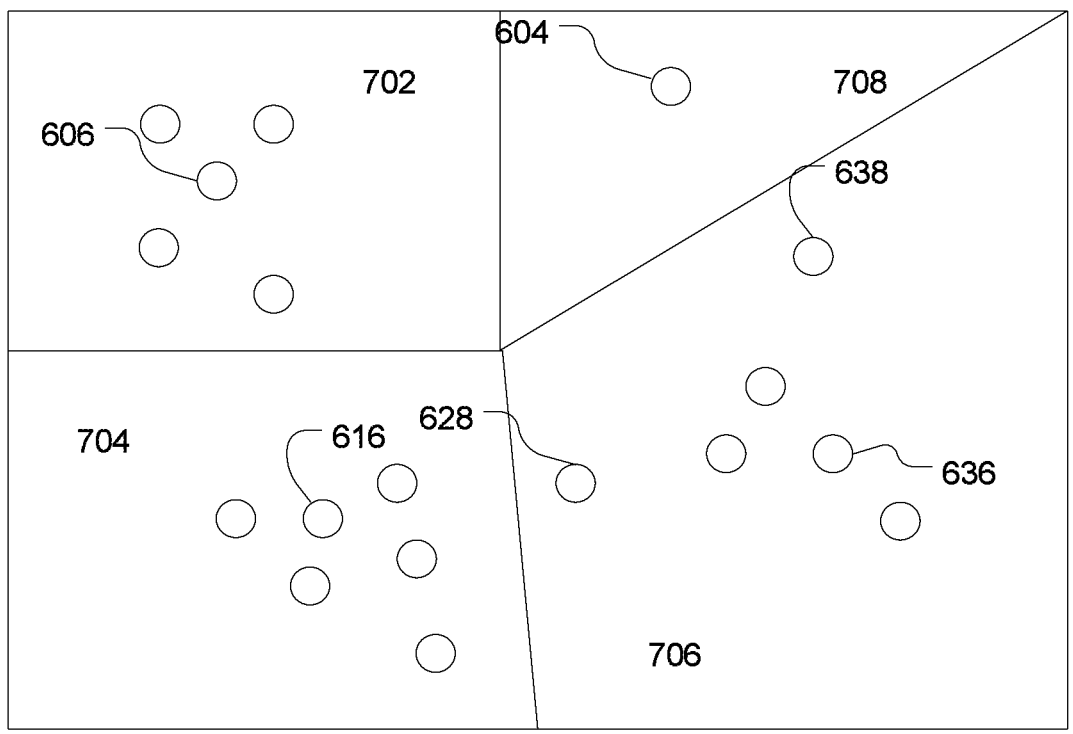
FIG. 7 is a schematic illustrating an alternative example of clustering.

FIG. 7 illustrates an alternative unsupervised learning clustering methodology. In this example, k-means clustering is used, where k is four, equating to the number of clusters. In this example, the usage data 604 is allocated a cluster 708, but this cluster has no other usage data.

One approach to determine similarity of clusters is to use the Jaccard index, also known as the Jaccard similarity coefficient, as this is a statistic used for comparing the similarity and diversity of sample sets. In simple cases where two sets are compared the index is a simple decimal statistic between 0 and 1.0. The Jaccard index of two identical sets is one, while the Jaccard index of two sets with no common elements yields zero. The Jaccard coefficient measures similarity between finite sample sets, and is defined as the size of the intersection divided by the size of the union of the sample sets.

In more complex cases, multiple events are compared in multiple dimensions. However, it is worth noting that for a broad range of data distributions and distance measures, the relative contrast diminishes as the dimensionality increases (known as the curse of dimensionality). In types of data distributions expected from this disclosure, the dimensionality of the data may be quite high given that the total number of events that are being measured is also high, that is in the order or hundreds or even thousands. As a result, the distance measure may have reduced utility as the number of dimensions increases.

In order to reduce the dimensionality of the data, it may be appropriate to use feature selection to try to find a subset of events that are generated. Generally, three strategies may be employed: filter (selecting characteristics such as by information gain including Kullback-Leibler divergence), wrapper (that evaluate subsets of variables that allows, unlike filter approaches, to detect the possible interactions between variables) and embedded (features are selected to be added or removed while building the model based on the prediction error).

Using a filter approach, for example, could determine that only a specific set of events are required to sufficiently distinguish the users. In practice, the dimensionality of the data is likely to be higher, but it is worth noting that it is potentially variable. In another example, sets of events can be determined such that a specified number of user groups, such as 10 or 12, are representative of a majority of differences in usage data.

Given that the dimension of the data is controlled by the usage data that is assessed, the usage data can be limited to the usage data that ensure that the data distribution does not produce irrelevant or redundant characteristics. In some cases, it may be useful to consider a subset of assessable usage data (a filter method) so that the distance measure remains effective. In this case, the subset of assessable criteria may be chosen such that the distance measure discriminates effectively based on the data distribution.

FIG. 8 is a table illustrating an example of clusters determined by a selection of five types of events. In this example, the event types include viewed globalSearchDrawer, viewed notificationsScreen, viewed viewAccountScreen, viewed viewIssueScreen, and viewed projectsScreen are sufficient to distinguish between six different clusters of users based on the average number of events that each user in that cluster triggers based on their corresponding usage data. An extra column is provided for comparison against the average number of events for all users.

In this example, each cluster 1 to 6 is defined in five dimensions in accordance with the relative average frequency of each event. In combination, these five dimensions determine a cluster. For illustration, users in cluster 6 view globalSearchDrawer on average 7.52 times, and view notificationsScreen on average 17.98 times. Both of which are significantly above a standard deviation from the mean for these particular events. In contrast, in the example of FIG. 8, users in cluster 1 are 0.3 of a standard deviation below the average for the viewIssueScreen event. As can be seen, each of the clusters have a distinctive combination of relative frequency of events such that they can be distinguished from the other clusters.

In terms of this disclosure, a designated user group represents a particular category of usage data based on the above clustering. Specifically, a designated user group is a group of people with its own distinctive interactions with the computer application based on a cluster analysis. As a result, a designated user group collectively represents a set of observable characteristics or traits of a group of users.

Associated with the designated user groups are application features that people in the designated user group would use, interact with or otherwise consume. Specific features are not associated with a single designated user group, but rather could be associated with many or even all the designated user groups. In some embodiments, specific features may differ between some or all designated user groups.

Although the designated user groups are not necessarily mutually exclusive, it is preferable that they are not so similar that it makes it difficult for the personalization engine 114 to allocate a user to a designated user group. Further, the designated user groups should typically cover as much as possible of the range of usage data.

Returning to FIG. 3, once the personalization engine 114 has determined designated user groups, the method proceeds to step 308, where the user group module 116 waits for a redetermination of the clusters and therefore the redesignation of user groups. This is optional as, in some embodiments, the designated user groups may be determined and fixed as a one off calculation. In the example process depicted in FIG. 3, the designated user groups are dynamic and flexible whereby the designated user groups may be recalculated. Recalculation may occur in real-time or close to real-time, on demand, and/or scheduled on a regular basis (e.g., every month, every six months, etc.).

Where the designated user groups are dynamic and flexible, the designated user groups may change when more application usage data is processed and added to the database 108.

As described above, process 400 is performed per user and used to identify a designated user group for a given user. This process begins at step 402, where the monitoring system 112 monitors the usage of an individual user. Again, the monitoring system 112 monitors the events that are generated by the user whenever the user interacts with the computer application. In one example, the monitoring system 112 receives events generated by the user's application client 122, creates an event data structure or table for the user and stores the event records in the created data structure or table. In such cases, the monitoring system 112 may maintain different data structures or tables for different users.

Then, similar to step 304, the monitoring system 112 compiles the monitored events into individual usage data (at step 404). When compiling the individual usage data, the monitoring system 112 may analyses the event types to determine if one or more event types triggered by the user are relevant or not and may discard events of event types that are considered irrelevant.

The personalization engine 114 then determines which designated user group fits the user based on the individual usage data of the user (at step 406). The personalization engine 114 can compare the user to the designated user group to determine how well the usage data of the user matches the usage data of a designated user group, for each designated user group that is currently in the database 108. In one embodiment, if there is a sufficient degree of match in the usage data, the user can be allocated to a designated user group. For example, a sufficient degree of match may be a threshold degree of similarity based on the five dimensions mentioned above. Alternatively, if there is an insufficient degree of match, then the personalization engine 114 may continue to wait for more usage data to be compiled for the user. In some cases, the personalization engine 114 may ignore a user until there is a sufficient amount of usage data for the user. If there is no further usage data from the user that can be used to allocate a designated user group, or if the personalization engine 114 has determined that there are no sufficient prospects of allocating the user to a designated user group, then the user may be allocated a designated user group based on a degree of similarity, which may be the highest degree of similarity to a designated user group but below a threshold value. In some cases, if a user does not fit into a cluster well, the user can be ignored or assigned a generic user group rather than being included in the nearest cluster. This may help preserve the integrity of clusters.

At the next step (step 408), the personalization engine 114 identifies one or more application features associated with the designated user group. In some embodiments, the feature module 120 may track features of the computer application, which are being used comparatively more frequently than other features. The feature module 120 may analyze the usage data produced by the monitoring system 112. In some cases, the feature module 120 may also analyze the raw events triggered by the user.

In either case, typically, the feature module 120 maintains an association between an event and a corresponding feature in the application. For example, a designated user group, nominally titled 'project manager', triggers a 'viewed viewIssueScreen' event more than other designated user groups. The feature module 120 maintains an association between viewIssueScreen and the 'view issue' item in a dashboard of the computer application. The personalization engine 114 may utilize this association to determine that a dashboard is a feature to be associated with the 'project manager' user group.

The personalization engine 114 interfaces with the application system 102 to personalize the computer application according to the one or more features of the application. The personalization engine 114 may cause the application system 102, for example, to present the one or more features as a default, present as a home page, promote the feature, change navigation options to make the feature more readily accessible or modify the flow of the application for the feature.

In processes 300 and 400, designated user groups are created based on application usage data. However, in some embodiments, designated user groups may be created based on one or more additional characteristics. For example, if a computer application is a business application, the designated user groups may be created based on job categories and usage data. In other applications, such as social media applications, the designated user groups may be created based on other user characteristics such as user age groups, location, language, etc., in combination with application usage data.

When additional user characteristics, such as job categories, are utilized either alone or in conjunction with application usage data to determine which designated user group fits a user, the computer application may request the user to provide this user characteristic, e.g., when the user first registers with the computer application. Then, this user characteristic may be utilized to assign a designated user group to the user.

Although this may be straightforward, in some cases, users may not correctly provide the requested characteristic. For example, if a user is requested to enter their job title in free form text, the user may incorrectly spell their job title or enter a job title that may be too specific or too broad to be intelligently utilized by the system. To account for these inconsistencies in the way users may input the requested user characteristics, aspects of the present disclosure are configured to identify and classify the user provided characteristics.

Figure 5:
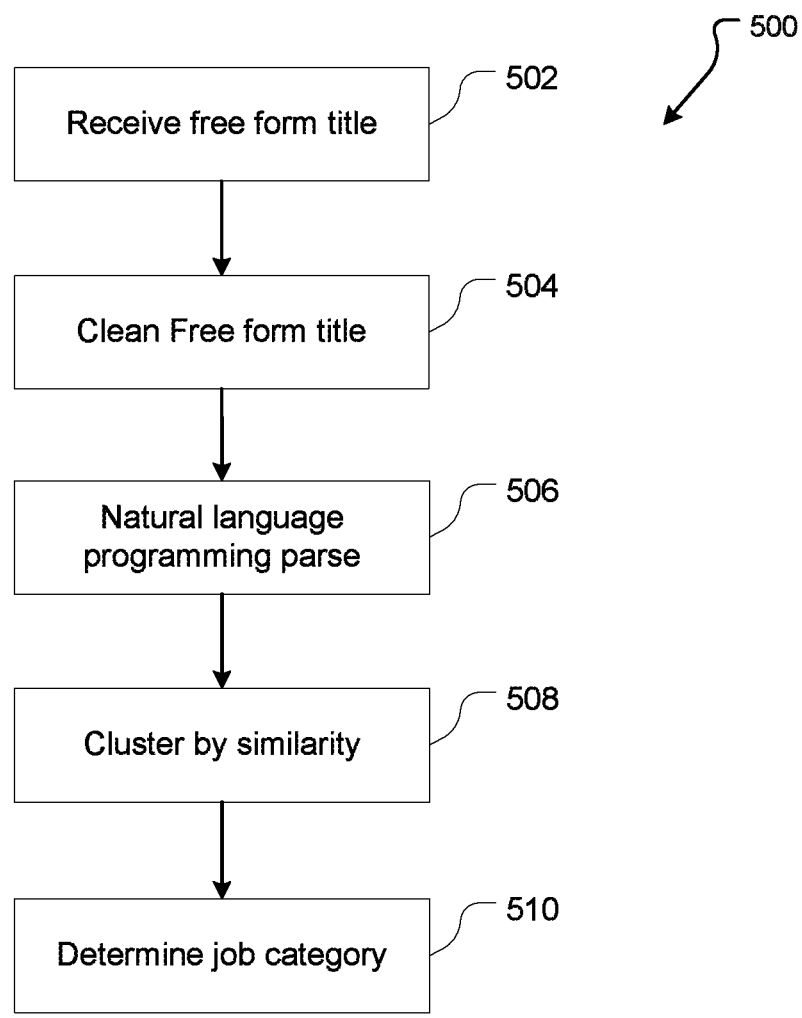
FIG. 5 is a flowchart illustrating an example method for determining a job category from a title.

FIG. 5 depicts a process for determining a job category from a free-form job title provided by a user. Although process 500 is described with respect to job categories, it will be appreciated that the process can just as easily be applied (with minor modifications) to any other type of user characteristic without departing from the scope of the present disclosure. For example, it should be noted that in some cases, a user might provide a job description rather than a job title.

Initially, at step 502, the user, through their user device 104, enters their job title as a free form text. Free form text is inherently difficult to categorize, as the text could be anything.

Accordingly, at step 504, the personalization engine 114 and particularly the title categorization module 118 cleans the received free form title first. This cleaning may include, e.g., correcting spelling errors, replacing abbreviations with their full form, correcting incorrect capitalizations, etc. For example, at this step the title categorization module 118 may correct the titles 'iOs DEVEloper' and 'iOs DeveELLOP-Perr,' into 'iOS Developer'. In addition to this, the title categorization module 118 may be pre-programmed with certain other rules for cleaning the data. For example, it may be programmed to remove any seniority for job titles. That is, the title categorization module 118 may be configured to modify a 'Senior iOS Developer' to an 'iOS Developer.' It will be appreciated that these are just examples, and other operations may be performed to clean the job titles at this step.

At the next step, (i.e., step 506), the title categorization module 118 parses the clean titles with natural language processing. In some embodiments, a word vector is used, such as 'Word2Vec.' A word vector can be used to determine similarity in semantic meaning between strings, typically of characters, even though the strings themselves are different.

At step 508, a clustering process is used to determine categories from the distribution of the titles. That is, clustering can be used to determine specific groupings of titles into categories. In one embodiment, the approach is to use a word vector language model that can receive free form text provided by a user and interpret its meaning. Clustering manages to group each title with other titles based on their contextual similarity.

This can be done in many ways, for example with a word vector model. A word vector model can be trained on articles from external sources such as Google News to learn relationships and similarities between words that occur in similar contexts. The trained word vector can learns relationships and similarities between words that occur in similar contexts in the sources that are provided to it, which can then be used to categorize the cleaned titles. Word2vec is one example of a word vector model. The word vector approach contrasts with using string similarity metrics like Levenshtein distance, which can be used but may end up with a less accurate result. For example, 'Artist' and 'Designer' are string dissimilar yet have very high cosine similarity in the model's vector space.

Two different job roles can be compared based on their orientation in vector space. For example, with two different job roles, even though the words themselves are fairly different, the cosine distance (that is, the cosine of the angle) between the two vectors in the embedding vector space can be calculated. The cosine distance, gives an indication that these words are similar in meaning, at least based on them being trained contextually (such as in this example Google News) through the word vector model. In the case of 'Software Engineer' and 'Application Developer' this may have a cosine distance of 0.8, which indicates that the words are similar. For 'Software Engineer' and 'Goat Herder' the cosine distance may be 0.2, and hence more dissimilar.

The more frequent user job titles can be used to calculate vectors representing each title. Each vector may be as long as the number of dimensions by which each vector is calculated. For example, the example word vector model provided by Google utilizes 300 dimensions. This would be significantly difficult to categories due to the high number of dimensions. Therefore, it is possible to utilize Uniform Manifold Approximation and Projection (UMAP) to project this complex high dimensional vector space down to just two dimensions for the purposes of illustration.

The distribution of data points for a large number of job titles may be quite complex and difficult to determine groupings. Therefore clustering can be done to determine specific groupings of titles into categories.

Different clustering techniques can be used. One such approach is to cluster based on a density of points, such as DBSCAN or HDBSCAN. In contrast to K-means clustering, if a point does not fit into a cluster well, it can be ignored rather than being included in the nearest cluster. This provides a noise-floor and helps preserve the integrity of clusters. This approach means a vague title like 'trainer' or 'master' have a reduced influence on the clustering.

Each cluster can then be assigned a category—e.g., marketing, sales, legal, finance, software development, operations, IT support, product customer service, etc. In some examples, some of the categories may overlap. For example, some of the job titles may be classified under the 'marketing' category and the 'product' category and some of titles classified under the 'product' category may also be classified under the 'software development' category.

As noted above in some cases, a user may provide a job description rather than a job title. This does not change how the title categorization module 118 operates, however the resulting category of the user may be different. For example, a user who is nominally a "product manager" in title may enter a "product developer" job description. The end result may mean that the user is allocated a category of "developer" instead of "product."

Although the title categorization module 118 is described in combination with the user group module 116, it is to be understood that the title categorization module 118 can operate independently of the user group module 116 in order to personalize an application in conjunction with the feature module 120. That is, it is possible for the feature module 120 to determine one or more features to be associated with a cluster determined from a job title as described above.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. Although these flowcharts define steps in particular orders to explain various features, in some cases the steps may be able to be performed in a different order. Furthermore, in some cases one or more steps may be combined into a single step, a single step may be divided into multiple separate steps, and/or the function(s) achieved by one or more of the described/illustrated steps may be achieved by one or more alternative steps. Still further, the functionality/processing of a given flowchart step could potentially be performed by various different systems or applications.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A computer-implemented method for personalization of a computer application for a user of a plurality of users, the computer-implemented method comprising:
    identifying a set of events associated with the plurality of users, each event of the set of events having a corresponding event type, the set of events corresponding to a usage of the computer application by the plurality of users;
    based on an analysis of the set of events:
       selecting an event type satisfying predictive criterion;
       using the selected event type, identifying a plurality of clusters of one or more users, a first cluster of the plurality of clusters having a different usage pattern for the usage of the computer application corresponding to the selected event type in comparison with a second cluster of the plurality of clusters;
       identifying a particular cluster of the plurality of clusters to which the user is associated; and
       assigning a set of computer application features of a plurality of computer application features to the particular cluster; and
    rendering and causing display of a set of graphical elements within a user interface of the computer application being operated by the user, the set of graphical elements corresponding to the set of computer application features assigned to the particular cluster associated with the user.

2. The computer-implemented method of claim 1, further comprising:
    based on one or more characteristics of a user profile of the user and the particular cluster:
       associating the user with a user group of a plurality of user groups; and
       assigning a second set of computer application features of the plurality of computer application features to the user group, the second set of computer application features comprising a subset of the set of computer application features; and
    rendering and causing display of a second set of graphical elements within the user interface of the computer application being operated by the user, the second set of graphical elements corresponding to the second set of computer application features assigned to the user group.

3. The computer-implemented method of claim 2, further comprising:
    re-determining the plurality of clusters of the one or more users based on additional usage of the computer application by the plurality of users; and
    associating the user with a second group of the plurality of user groups based on the re-determining the plurality of clusters of the one or more users and the one or more characteristics of the user profile of the user.

4. The computer-implemented method of claim 3, wherein re-determining the plurality of clusters of the one or more users occurs at a predetermined frequency.

5. The computer-implemented method of claim 2, further comprising: monitoring aggregated usage of the computer application by the plurality of users, the monitoring the aggregated usage comprising tracking event records related to user interactions with the computer application.

6. The computer-implemented method of claim 5, wherein the monitoring the aggregated usage of the computer application further comprises discarding events in the event records that:
    are not relevant for determining the plurality of clusters;
    are not predictive for determining the plurality of clusters;
    increase computation cost of determining the plurality of clusters above a threshold cost; or
    increase complexity of determining the plurality of clusters above a threshold complexity.

7. The computer-implemented method of claim 6, wherein discarding the events in the event records that are not relevant is based on predetermined criteria that change over time.

8. The computer-implemented method of claim 2, wherein the plurality of clusters is determined based on one or more clustering techniques including:
    subspace clustering;
    projected clustering;
    hybrid approaches;
    pattern based clustering;
    k-means clustering; or
    correlation clustering.

9. The computer-implemented method of claim 1, further comprising:
    monitoring the usage of the computer application by the user corresponding to the set of events over a second period of time;
    based on analysis of the set of events corresponding to the usage of the computer application by the plurality of users over the second period of time:
    associating the user with a cluster of the plurality of clusters, the cluster of the plurality of clusters is different from the particular cluster; and
    re-personalizing the computer application for the user by assigning a second set of computer application features assigned to the cluster.

10. The computer-implemented method of claim 9, wherein associating the user with the cluster occurs at a specified frequency.

11. A computer processing system comprising:
    a processing unit;
    a communication interface; and
    a non-transitory computer-readable medium storing sequences of instructions which, when executed by the processing unit, cause the processing unit to:

identify a set of events associated with a plurality of users, each event of the set of events having a corresponding event type, the set of events corresponding to a usage of a computer application by the plurality of users over a period of time;

based on an analysis of the set of events:
select an event type satisfying predictive criteria;
using the selected event type, identify a plurality of clusters, each cluster of the plurality of clusters including one or more users, a first cluster of the plurality of clusters having a first usage pattern corresponding to the selected event type, a second cluster of the plurality of clusters having a second usage pattern corresponding to the selected event type, the first usage pattern is different from the second usage pattern;
identify a particular cluster of the plurality of clusters to which a user of the plurality of users is associated, the particular cluster is the first cluster or the second cluster; and
assign a first set of computer application features of a plurality of computer application features to the first cluster, and a second set of computer application features of the plurality of computer application features to the second cluster; and
render and cause display of a set of graphical elements within a user interface of the computer application operated by the user, the set of graphical elements corresponding to a respective set of computer application features assigned to the particular cluster to which the user is associated.

12. The computer processing system of claim 11, wherein the sequences of instructions which, when executed by the processing unit, further cause the processing unit to:
based on one or more characteristics of a user profile of the user and the particular cluster, the one or more characteristics of the user profile including a role of a user account of the user:
associate the user with a user group of a plurality of user groups; and
assign a third set of computer application features of the plurality computer of application features to the user group, the third set of computer application features comprising a subset of the first set of computer application features or the second set of computer application features; and
render and cause display of a third set of graphical elements within the user interface of the computer application being operated by the user, the third set of graphical elements corresponding to the third set of computer application features assigned to the user group.

13. The computer processing system of claim 12, wherein the sequences of instructions which, when executed by the processing unit, further cause the processing unit to:
re-determine the plurality of clusters based on additional usage of the computer application by the plurality of users; and
assign the user with a second group of the plurality of user groups based on the re-determining the plurality of clusters and the one or more characteristics of the user profile of the user.

14. The computer processing system of claim 13, wherein re-determining the plurality of clusters occurs at a predetermined frequency.

15. The computer processing system of claim 12, wherein the plurality of clusters is determined based on one or more clustering techniques including:
subspace clustering;
projected clustering;
hybrid approaches;
pattern based clustering;
k-means clustering; or
correlation clustering.

16. The computer processing system of claim 12, wherein the sequences of instructions which, when executed by the processing unit, further cause the processing unit to:
monitor aggregated usage of the computer application by tracking event records related to user interactions with the computer application.

17. The computer processing system of claim 16, wherein to monitor the aggregated usage of the computer application, the sequences of instructions which, when executed by the processing unit, further cause the processing unit to:
discard an event in the event records that:
is not relevant for determining the plurality of clusters;
is not predictive for determining the plurality of clusters;
increases computation cost of determining the plurality of clusters above a threshold cost; or
increases complexity of determining the plurality of clusters above a threshold complexity.

18. The computer processing system of claim 17, wherein the event that is not relevant is discarded based on a specified criterion that changes over time.

19. The computer processing system of claim 11, wherein the sequences of instructions which, when executed by the processing unit, further cause the processing unit to:
monitor the usage of the computer application by the user corresponding to the identified set of events over a second period of time;
based on analysis of the set of events corresponding to the usage of the computer application by the plurality of users over the second period of time:
associate the user with a cluster of the plurality of clusters, the cluster of the plurality of clusters is different from the particular cluster; and
re-personalize the computer application for the user by assigning a third set of computer application features corresponding to the cluster to which the user is associated.

20. The computer processing system of claim 19, wherein the second period of time occurs at a specified frequency.

* * * * *